United States Patent
Hahn et al.

(10) Patent No.: US 8,417,668 B2
(45) Date of Patent: *Apr. 9, 2013

(54) DEVICE AND METHOD OF INTEGRATING FILE SYSTEMS

(75) Inventors: Judah Gamliel Hahn, Ofra (IL); Donald Ray Bryant-Rich, Haifa (IL); Rotem Gazit, Kfar Saba (IL); Ziv Baduach, Moshav Yarhiv (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,835

(22) Filed: May 9, 2011

(65) Prior Publication Data
US 2011/0208699 A1 Aug. 25, 2011

Related U.S. Application Data

(63) Continuation of application No. 11/968,202, filed on Jan. 2, 2008, now Pat. No. 7,966,288.

(51) Int. Cl.
*G06F 7/00* (2006.01)
(52) U.S. Cl. .................................................. 707/636
(58) Field of Classification Search .................. 707/636
See application file for complete search history.

(56) References Cited

U.S. PATENT DOCUMENTS

| | | | |
|---|---|---|---|
| 6,173,293 B1 * | 1/2001 | Thekkath et al. ........................ | 1/1 |
| 7,073,010 B2 | 7/2006 | Chen et al. | |
| 7,184,264 B2 | 2/2007 | Le | |
| 7,962,517 B2 * | 6/2011 | Tritt et al. ........................ | 707/784 |
| 2001/0037406 A1 * | 11/2001 | Philbrick et al. ............... | 709/250 |
| 2004/0133650 A1 | 7/2004 | Miloushev et al. | |
| 2005/0005044 A1 | 1/2005 | Liu et al. | |
| 2005/0120157 A1 * | 6/2005 | Chen et al. ...................... | 710/313 |
| 2006/0015676 A1 * | 1/2006 | Oribe et al. ...................... | 711/103 |
| 2007/0058933 A1 * | 3/2007 | Kobayashi et al. .............. | 386/95 |
| 2007/0065119 A1 * | 3/2007 | Pomerantz ....................... | 386/125 |
| 2007/0271558 A1 * | 11/2007 | Lim et al. ........................ | 717/174 |

FOREIGN PATENT DOCUMENTS

EP 1650665 A1 4/2006

OTHER PUBLICATIONS

International Search Report and Written Opinion mailed Jul. 28, 2008 in International Application No. PCT/IL2008/000042, 13 pages.
Notice of Allowance and Fee(s) Due mailed Feb. 17, 2011 in U.S. Appl. No. 11/968,202, 12 pages.
Final Office Action mailed Aug. 24, 2010 in U.S. Appl. No. 11/968,202, 18 pages.

(Continued)

*Primary Examiner* — Binh V Ho
(74) *Attorney, Agent, or Firm* — Toler Law Group, PC

(57) ABSTRACT

A device for integrating file systems includes a plurality of storage device interfaces. Each storage device interface is operatively coupleable to a corresponding storage device, and each storage device has a corresponding storage device file system. The device also includes a host interface and a hub configured for operatively connecting between the storage device interfaces and the host interface. The hub is operative to create a virtual file system that aggregates the storage device file systems. The virtual file system is configured to represent to a host, via the host interface, each file of a first group and to refrain from representing to the host each file of a second group, where the files are stored in one or more of the plurality of storage devices. Each file of the first group satisfies a first condition and each file of the second group fails to satisfy the first condition.

20 Claims, 3 Drawing Sheets

OTHER PUBLICATIONS

Non-Final Office Action mailed Mar. 17, 2010 in U.S. Appl. No. 11/968,202, 10 pages.
First Office Action issued Oct. 26, 2011 in Chinese Application No. 200880123377.9 with English translation, 16 pages.
Second Office Action issued Apr. 16, 2012 in Chinese Application No. 200880123377.9 with English translation, 16 pages.
Office Action issued Sep. 16, 2011 in Taiwanese Application No. 097101840 with English translation, 14 pages.

* cited by examiner

DEVICE AND METHOD OF INTEGRATING
FILE SYSTEMS

REFERENCE TO EARLIER-FILED APPLICATIONS

This application claims priority from U.S. patent application Ser. No. 11/968,202, filed Jan. 2, 2008, the contents of which is incorporated by reference herein in its entirety.

FIELD OF THE DISCLOSURE

The present disclosure is generally related to integrating file systems.

BACKGROUND

Despite the increased storage capacities of newly developing storage devices, such as the most recent versions of a USB flash drive, a user's storage needs will often exceed that which was once adequate. At that point, the user wanting to increase storage capacity has various options. One option is to obtain a new storage device with a greater capacity, when such a storage device becomes available, and the user will then have the task of transferring all existing stored data from the old storage device to the new storage device. The old storage device then becomes an unused resource.

Another option for a user wanting to increase storage capacity is to obtain additional storage devices and store data on the old and new devices. The user then has to manage data that is stored on multiple storage devices. The task can become burdensome as the user needs to access more and more file systems instead of one, which is the case when a single storage device has enough capacity for all the user's needs.

It would be desirable to be able to increase a host's storage capacity by using multiple storage devices and to be able to combine the device contents into a unified file system regardless of any difference in the file system formats of the underlying storage devices.

SUMMARY

The present inventors have developed devices and methods for integrating file systems, which enable a user to increase storage capacity for a host by using multiple storage devices and virtualizing the device contents into a single file system regardless of any difference in the device file systems.

According to an example embodiment, a device for integrating file systems includes one or more storage device interfaces, a host interface, and a hub. The storage device interfaces are for storage devices, each of which has a storage device file system. The hub is operationally connected to the storage device interfaces and to the host interface, and the hub is operative to create a virtual file system that aggregates the storage device file systems. The virtual file system may aggregate the storage device file systems according to one or more first conditions, at least one of which may be a host-level condition or a file-level condition. The hub may be further operative to distribute the contents of a file received from the host interface to at least two of the storage devices and to represent the file in the virtual file system as an undivided entity. Alternatively, the hub may be further operative to route the contents of a file received from the host interface to only one of the storage devices according to one or more second conditions.

The device may have additional features. For example, at least one of the storage device interfaces may comply with the USB standard. Also, the host interface may be a wired interface, and the wired interface may comply with the USB standard. The host interface may be a wireless interface. The hub may be further operative to create and maintain redundant file systems.

According to an example embodiment, a method of integrating file systems includes reading file systems of two or more storage devices, interpreting the file systems, creating a logical structure containing the data in the interpreted file systems, and generating in a memory sectors that map the logical structure into a virtual file system. The reading of the file systems may include communicating in compliance with the USB standard. The logical structure may be created according to one or more first conditions, at least one of which can be a host-level condition or a file-level condition. The method may include creating and maintaining a redundant file system.

The method may further include representing a file in the virtual file system as an undivided entity, wherein the contents of the file are distributed across two or more of the storage devices. Alternatively, the method may further include routing the contents of a file received from a host to only one of the storage devices according to one or more second conditions.

The method may further include representing the virtual file system to a host through a wired interface, and the wired interface may comply with the USB standard. Alternatively, the method may include representing the virtual file system to a host through a wireless interface.

Example embodiments are described in detail below with reference to the accompanying drawings, which are briefly described as follows.

DETAILED DESCRIPTION

The claims below will be better understood by referring to the present detailed description of example embodiments. This description is not intended to limit the scope of claims but instead to provide examples. Described first is an exemplary embodiment of a file system integrator. Described next is an alternate exemplary embodiment of a file system integrator. Also presented is a method of integrating file systems.

Figure 1:
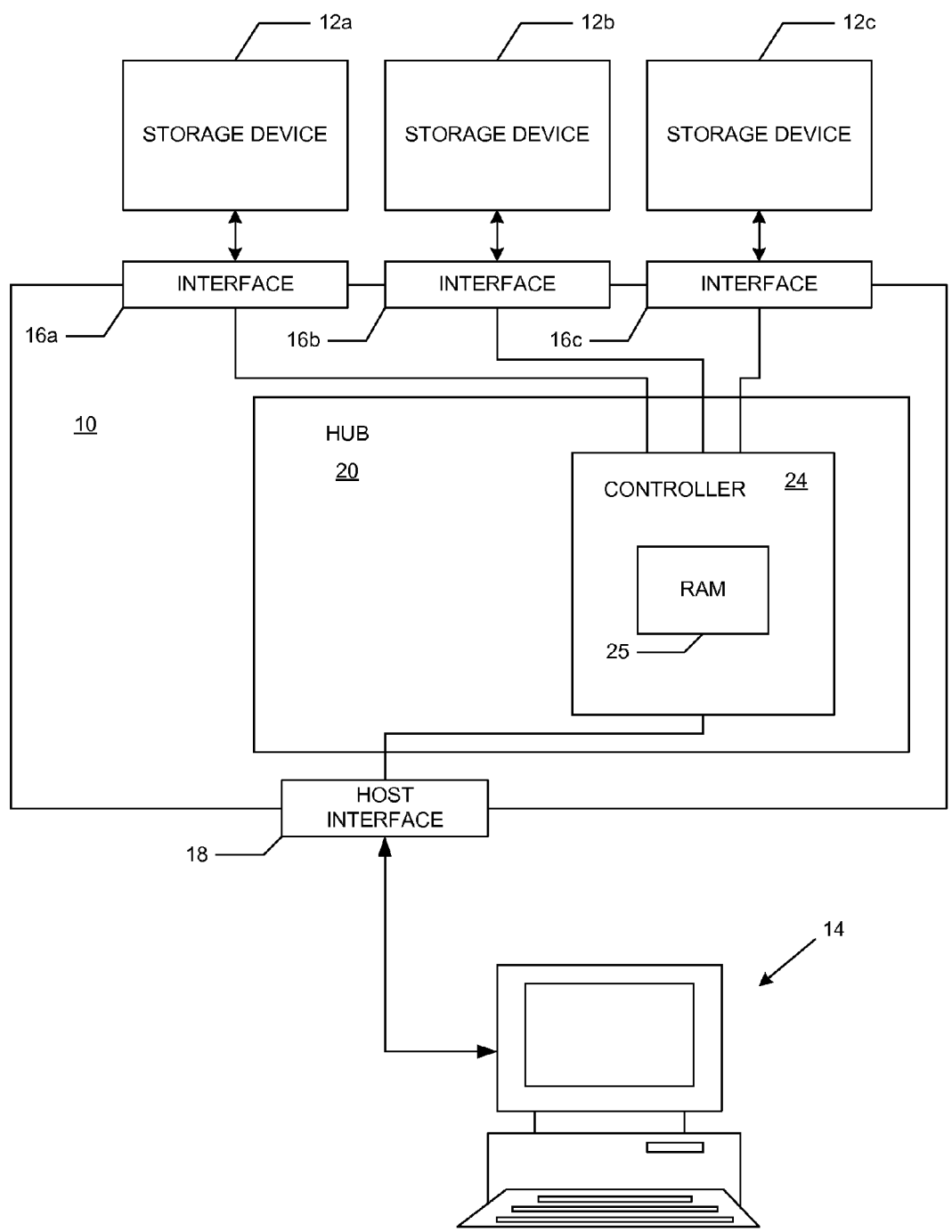
FIG. 1 illustrates a system including a file system integrator in accordance with a first example embodiment.

FIG. 1 illustrates, in accordance with an exemplary embodiment, a file system integrator 10 in combination with storage devices 12a, 12b, and 12c and a host 14. Non-limiting examples of storage devices in this system include USB flash drives, compact disks (CDs), and DVDs. The host 14 shown in FIG. 1 is a personal computer, but other hosts that can be fashioned to operate with the file system integrator include, e.g., vehicle entertainment systems and DVD players. The file system integrator 10 enables a user to integrate file systems regardless of any differences in the individual file systems (e.g., in the file system formats) of the attached storage devices.

The file system integrator 10 includes storage device interfaces 16a, 16b, and 6c, a host interface 18, and a hub 20. The storage device interfaces 16a, 16b, and 16c connect the storage devices 12a, 12b, and 12c, respectively, to the hub 20. Each of the storage devices 12a, 12b, and 12c has a storage device file system. The hub 20 is also connected to the host interface 18. The hub 20 can be implemented as hardware, software, firmware, or any combination thereof. In this example embodiment, the hub 20 includes a controller 24, which has a RAM 25. Although this example embodiment involves three storage devices and three corresponding storage device interfaces, it will be understood that the number of storage devices and corresponding storage device interfaces is not limited to this.

Upon connection of the storage devices 12a, 12b, and 12c, a controller 24 of the hub 20 creates a virtual file system that aggregates the individual storage device file systems. The virtual file system may operate to aggregate the storage device file systems according to special conditions. Such operation can be useful in situations where system resources did not need to be used to aggregate the information of files that would not be used by a particular host. For example, if the file system integrator 10 were intended for a host that is a DVD player, the file system could operate according to a special condition whereby the file system disregards during aggregation any information relating only to files that the DVD player could not read. The resulting virtual file system would represent to the DVD player only the files that it could read.

The hub 20 may store a file from the host 14 by distributing the contents of the file to at least two of the storage devices 12a, 12b, and 12c. The stored file would nonetheless be represented in the virtual file system as an undivided entity. Distributing file contents among multiple storage devices is useful, for example, when none of the storage devices 12a, 12b, and 12c individually has enough free space for the file, but the total amount of unused space in the storage devices collectively is enough.

The above example of aggregating only files in DVD format is an example of a host-level condition. The host may additionally or alternatively aggregate files according to a file-level condition. For example, if files contents from a file sent by the host 14 were previously distributed across multiple storage devices, and one of those storage devices were not presently connected to the host 14, the complete contents of the file would not be available to the host 14. The hub 20 may then aggregate according to the file-level condition that information relating to files in which the complete contents are not available is disregarded.

Alternatively, the hub 20 may be designed to route the contents of a file received from the host 14 to only one of the storage devices 12a, 12b, and 12c according to one or more special conditions. For example, a condition could be to route the contents of a file to only one of storage devices 12a, 12b and 12c, if a particular one of the storage devices has enough room for the file; such routing would save system resources by eliminating spanning as unnecessary. Another example condition would be to route the contents of a file to a particular storage device based on the file type; for instance, all DVD files would be stored on the storage device 12a, all audio files would be stored on the storage device 12b, and remaining files would be stored on the storage device 12c.

According to this example embodiment, the storage device interfaces 16a, 16b, and 16c comply with the USB standard. However, storage device interfaces complying with other standards may be implemented instead or in addition.

Again, according to this example embodiment, the host interface 18 complies with the USB standard, but alternate embodiments may use different wired interfaces as the host interface. As a further alternative, the host interface could be a wireless interface.

The hub 20 may be designed to create and maintain redundant file systems. An example of such a file system would be that of RAID (Redundant Arrays of Independent Disks) 1. RAID is an industry standard that encompasses data storage schemes that divide and/or replicate data among multiple hard drives. A number of standard schemes have evolved which are referred to as levels. The first level (designated as "RAID-1") creates an exact copy (or mirror, or replica) of a set of data on two or more disks in a way that is transparent to the host. Hub 20 may also create and maintain redundant file systems using other ways known to those of skill in the art.

Figure 2:
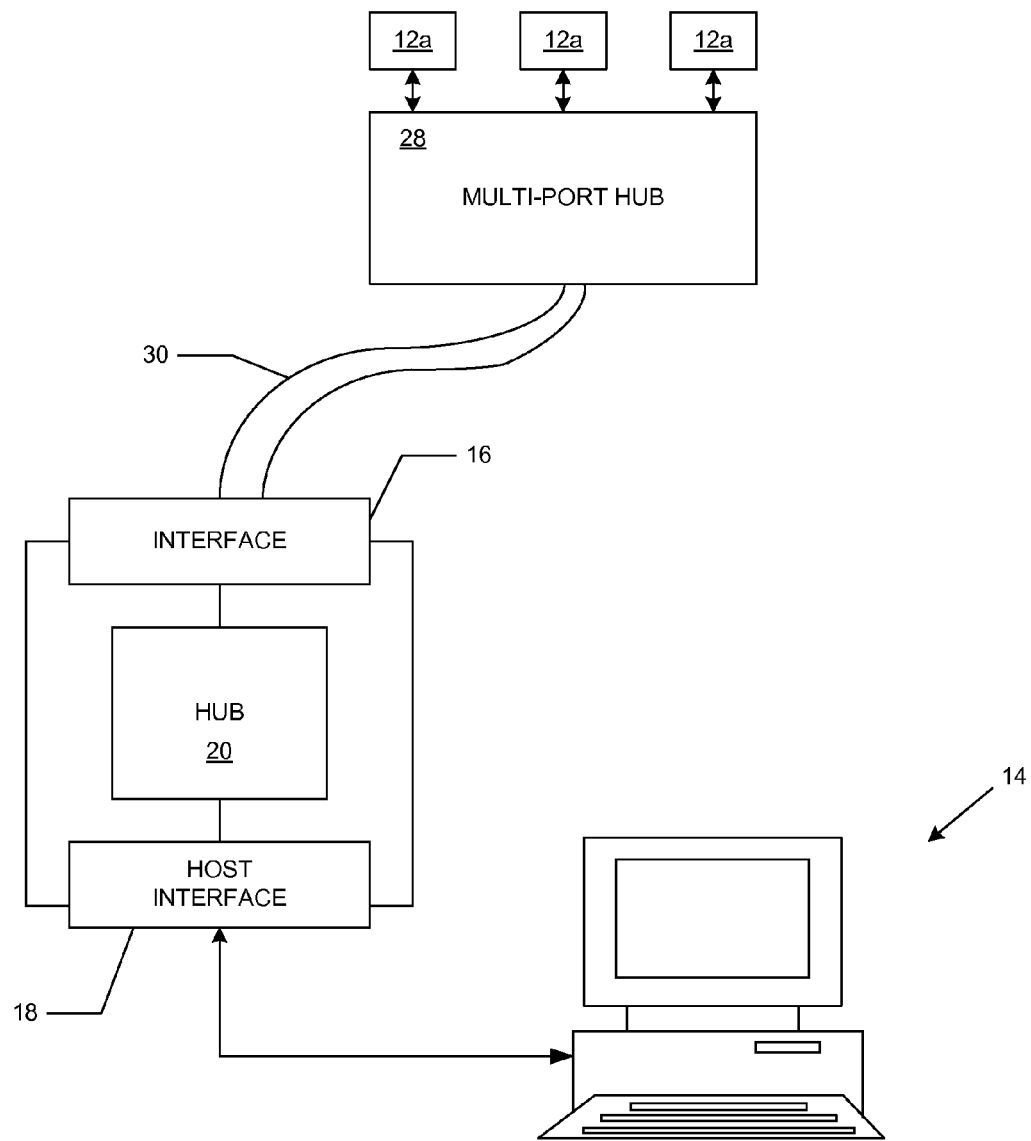
FIG. 2 illustrates a system including a file system integrator in accordance with an alternate example embodiment.

Although the above example embodiment includes multiple storage device interfaces 16a, 16b, and 16c, the device may be implemented as a file system integrator 26 having only one interface 16, as shown in FIG. 2. The other elements of the file system integrator 26 are the same as in the first example embodiment, as represented using the same reference numbers. (Hub 20 of the file system integrator 26 also includes a controller 24 and RAM 25, as shown in FIG. 1, even though for convenience these elements have been omitted from FIG. 2.) Note also that as with the example embodiment represented in FIG. 1, although the example embodiment of FIG. 2 involves only one storage device and one storage device interface, the number of storage devices and storage device interfaces is not limited to such.

According to the embodiment shown in FIG. 2, the hub 20 still creates a virtual file system that aggregates individual storage device file systems, even though the file system integrator 26 has only one storage device interface 16. The file system integrator 26 is able to access multiple storage devices 12a, 12b, and 12c, and hence multiple file systems, by a connection to the storage devices 12a, 12b, and 12c through a multi-port hub 28, such as a USB hub, which connects the storage device interface 16 using, e.g., a cable 30.

In other embodiments, the file system integrator 10 or 26 can be built into the outer casing of the host 14, with only the storage device interface 16 or interfaces 16a, 16b and 16c exposed. Alternatively, the file system integrator 10 or 26 can be joined to a general purpose interface, such as a USB port, of the host 14 and the ports of the multi-port hub 28 or of interfaces 16a, 16b and 16c can be placed in a convenient location for the user of the host 14.

Figure 3:
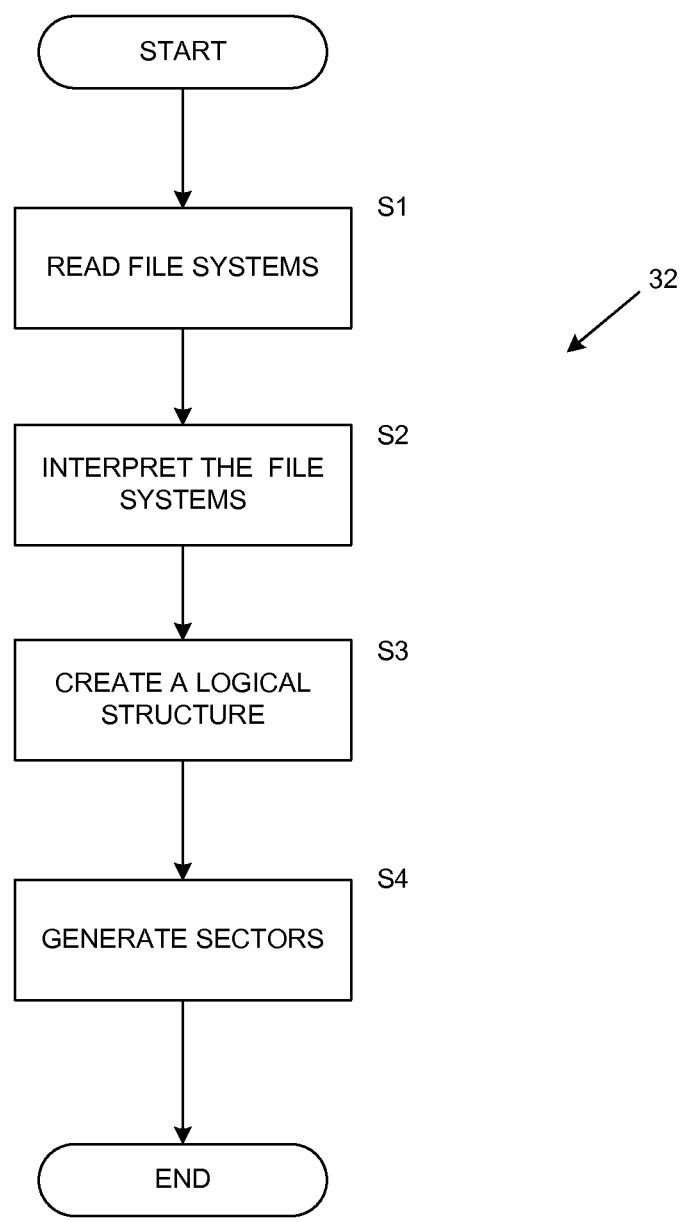
FIG. 3 illustrates a flow chart representing a method of integrating file systems in accordance with an example embodiment.

Another example embodiment is a method of integrating file systems, as represented by flow chart 32 in FIG. 3. This method may be practiced using the file system integrator 10 of FIG. 1, the file system integrator 26 of FIG. 2, or alternate apparatus. The method enables a user to integrate file systems regardless of any differences in the individual file systems.

As shown in FIG. 3, the first step in the method is to read the file systems of two or more storage devices. (Step S1.)

The next step is to interpret the file systems. (Step S2.) File systems are interpreted by performing logical transformations of data based on information in the file systems and on other factors, such as the type of host (for example, a DVD player or a personal computer), the identity of the user, or the presence of all parts of a spanned file. The data to be transformed does not need to be limited to those of homogenous file systems. Accordingly, file systems may be aggregated from storage devices having differing file system formats.

After the file systems are interpreted, a logical structure is created. (Step S3.) Such a logical structure may be created, e.g., analogously to how logical structures are created by using the "FORMAT" command in Windows®, or by using the "mkfs" command in Linux, or in other ways known to those of skill in the art. The logical structure created in step S3 is then populated with the data in the interpreted file systems of step S2.

Then, sectors are generated in a memory, such as in the RAM 25 in the controller 24 of hub 20 (FIG. 1). (Step S4). The sectors map the logical structure into a virtual file system as seen from a host. That is, the generated sectors contain the logical structure of the virtual file system as seen from the host.

Variations of this method are included herein. For example, the reading of the file systems may be adapted to include communicating in compliance with the USB standard. The logical structure may be created according to conditions, such as a host-level condition or a file-level condition. The method may include creating and maintaining a redundant file system.

The method may include the step of representing a file in the virtual file system as an undivided entity such that the contents of the file are distributed across two or more of the storage devices. Alternatively, the method may include the step of routing the contents of a file received from a host to only one of the storage devices according to specified conditions.

The method may include the step of representing the virtual file system to a host through a wired interface, which may comply with the USB standard. Alternatively, the method may include representing the virtual file system to a host through a wireless interface, such as one complying with the Bluetooth or Wi-Fi standards.

Having thus described exemplary embodiments, it will be apparent that various alterations, modifications, and improvements will readily occur to those skilled in the art. Alternations, modifications, and improvements of the disclosed embodiments, though not expressly described above, are nonetheless intended and implied to be within the scope of the claims. Accordingly, the foregoing discussion is intended to be illustrative only; the invention is limited and defined only by the following claims and equivalents thereto.

What is claimed is:

1. A device for integrating file systems, the device comprising:
    a plurality of storage device interfaces operatively coupleable to a plurality of storage devices;
    a host interface; and
    a hub configured for operatively connecting between the storage device interfaces and the host interface, wherein the hub is configured to represent to a host a group of files as a virtual file system, via the host interface, wherein data of the group of files is stored in at least two of the storage devices, and wherein each stored file of the group of files satisfies a first condition, the first condition specifying that the stored file is readable by the host,
    wherein a first file of the group of files resides in a first storage device of the plurality of storage devices, wherein the first storage device has a first storage device file system,
    wherein a second file of the group of files resides in a second storage device of the plurality of storage devices, wherein the second storage device has a second storage device file system, wherein the first storage device file system is distinct from the second storage device file system, and
wherein the group of files is represented to the host as the virtual file system further conditioned on performing a logical transformation of data corresponding to the first file, the logical transformation related to aggregating the first file, in a first file system format, with the second file in a second file system format.

2. The device of claim 1, wherein the hub is further operative to route the contents of a particular file received from the host interface to only one of the plurality of storage devices according to a second condition.

3. The device of claim 1, wherein the first file system format is distinct from the second file system format.

4. The device of claim 1, wherein the first storage device file system and the second storage device file system are readable by the host, wherein the host is configured to communicate in compliance with a universal serial bus (USB) standard.

5. The device of claim 1, wherein at least one of the storage device interfaces is a wireless interface.

6. The device of claim 1, wherein the host interface is a wired interface.

7. The device of claim 1, wherein the host interface is a wireless interface.

8. The device of claim 1, wherein a first portion of a distributed file of the group of files is distributed to a particular storage device of the plurality of storage devices via a first storage device interface of the plurality of storage device interfaces and a second portion of the distributed file is distributed to another storage device of the plurality of storage devices via a second storage device interface of the plurality of storage device interfaces.

9. The device of claim 1, wherein the logical transformation is based on a type of the host.

10. The device of claim 1, wherein the logical transformation is based on an identity of a user of the device.

11. A method of integrating file systems, the method comprising:
    interpreting the file systems to enable access to each of the file systems by a host via a virtual file system, wherein interpreting includes performing a logical transformation of data stored in a first file system of the file systems, wherein the file systems include the first file system of a first storage device and a second file system of a second storage device, the first file system having a first file format that differs from a second file format that is associated with the second file system; and
    creating a logical structure that includes the data stored in the interpreted file systems,
wherein contents of a first file are distributed among the first storage device and the second storage device, and wherein the contents of the first file are represented in the virtual file system by an undivided entity.

12. The method of claim 11, further comprising generating sectors that map the logical structure into the virtual file system.

13. The method of claim 12, further comprising representing the virtual file system to the host through a wireless interface.

14. The method of claim 11, further comprising reading one or more of the file systems by communicating in compliance with a universal serial bus (USB) standard.

15. The method of claim 11, wherein the logical transformation is performed based on a type of the host that is to access an integrated file system that includes the logical structure.

16. The method of claim 11, wherein the logical transformation is performed based on information in one of the file systems.

17. A method of integrating file systems, the method comprising:

interpreting the file systems to enable access to each of the file systems by a host via a virtual file system, wherein interpreting includes performing a logical transformation of data stored in a first file system of the file systems to provide transformed data, wherein the file systems include the first file system of a first storage device and a second file system of a second storage device, the first file system having a first file format that differs from a second file format that is associated with the second file system; and creating a logical structure that includes the transformed data, wherein the logical transformation is performed based on detecting a presence of all parts of a spanned file, wherein the spanned file spans at least the first storage device and the second storage device.

18. The method of claim 17, wherein the logical transformation is based on a type of the host.

19. The method of claim 17, wherein contents of the spanned file are distributed among the first storage device and the second storage device, and wherein the contents of the spanned file are represented in the virtual file system by an undivided entity.

20. The method of claim 17, wherein the logical transformation is based on an identity of a user of the device.

* * * * *